(12) United States Patent
Kim et al.

(10) Patent No.: US 12,683,166 B2
(45) Date of Patent: Jul. 14, 2026

(54) COMPOSITE PARTICLE INCLUDING ELECTRODE MATERIAL AND ELECTRODE FOR ELECTROCHEMICAL DEVICE INCLUDING THE SAME

(71) Applicant: LG Energy Solution, Ltd., Seoul (KR)

(72) Inventors: Hak-Yoon Kim, Daejeon (KR);
Hyeon-Jeong Kang, Daejeon (KR);
Chang-Yoon Lim, Daejeon (KR);
Moon-Soo Park, Daejeon (KR);
Ho-Hyeon Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/833,764

(22) PCT Filed: Jan. 30, 2023

(86) PCT No.: PCT/KR2023/001365
§ 371 (c)(1),
(2) Date: Jul. 26, 2024

(87) PCT Pub. No.: WO2023/146375
PCT Pub. Date: Aug. 3, 2023

(65) Prior Publication Data
US 2025/0112227 A1 Apr. 3, 2025

(30) Foreign Application Priority Data

Jan. 28, 2022 (KR) ........................ 10-2022-0013754
Mar. 14, 2022 (KR) ........................ 10-2022-0031703

(51) Int. Cl.
*H01M 4/62* (2006.01)
*H01M 4/133* (2010.01)
(Continued)

(52) U.S. Cl.
CPC ............. *H01M 4/62* (2013.01); *H01M 4/133* (2013.01); *H01M 4/583* (2013.01); *H01M 4/621* (2013.01);
(Continued)

(58) Field of Classification Search
CPC ...... H01M 4/622; H01M 4/621; H01M 4/583; H01M 4/133; H01M 4/625;
(Continued)

(56) References Cited

U.S. PATENT DOCUMENTS

2009/0325075 A1 12/2009 Tsuchiya et al.
2011/0285486 A1 11/2011 Maeda et al.
(Continued)

FOREIGN PATENT DOCUMENTS

CN 102956889 A 3/2013
CN 103168378 A 6/2013
(Continued)

OTHER PUBLICATIONS

International Search Report for Application No. PCT/KR2023/001365 mailed May 9, 2023, 3 pages.
(Continued)

*Primary Examiner* — Laura Weiner
(74) *Attorney, Agent, or Firm* — Lerner David LLP

(57) ABSTRACT

An electrode and an electrochemical device including the same. The electrode includes a current collector, and an electrode active material layer formed on the current collector, wherein the electrode active material layer includes granules, and the granule shows a higher binder content ratio in the surface portion as compared to the binder content ratio in the core portion.

4 Claims, 10 Drawing Sheets

(51) Int. Cl.
H01M 4/583 (2010.01)
H01M 4/02 (2006.01)

(52) U.S. Cl.
CPC ........... H01M 4/622 (2013.01); H01M 4/625
(2013.01); *H01M 2004/027* (2013.01)

(58) Field of Classification Search
CPC ..... H01M 2004/021; H01M 2004/027; H01M
4/64; H01M 4/587; H01M 4/525; H01M
4/505; H01M 4/131; H01M 2004/028;
H01M 4/62
See application file for complete search history.

(56) References Cited

U.S. PATENT DOCUMENTS

| | | | |
|---|---|---|---|
| 2012/0264014 A1 | 10/2012 | Tsuchiya et al. |
| 2013/0209889 A1 | 8/2013 | Takahata |
| 2014/0342225 A1 | 11/2014 | Isshiki et al. |
| 2016/0156016 A1 | 6/2016 | Umeyama et al. |
| 2018/0090770 A1 | 3/2018 | Park et al. |
| 2019/0027740 A1 | 1/2019 | Lee et al. |
| 2019/0140254 A1 | 5/2019 | Kim et al. |
| 2020/0266446 A1 | 8/2020 | Schroder et al. |
| 2020/0321599 A1 | 10/2020 | Kim et al. |
| 2020/0403231 A1 | 12/2020 | Kim et al. |
| 2021/0043927 A1 | 2/2021 | Yang |

FOREIGN PATENT DOCUMENTS

| | | | |
|---|---|---|---|
| CN | 105655546 A | 6/2016 |
| CN | 105977463 A | 9/2016 |
| CN | 107871874 A | 4/2018 |
| CN | 108701810 A | 10/2018 |
| CN | 111247668 A | 6/2020 |
| CN | 111771300 A | 10/2020 |
| EP | 2380685 A1 | 10/2011 |
| JP | 2012134068 A | 7/2012 |
| JP | 2014035859 A | 2/2014 |
| JP | 2017208207 A | 11/2017 |
| KR | 20140091152 A | 7/2014 |
| KR | 20160063991 A | 6/2016 |
| KR | 20170037377 A | 4/2017 |
| KR | 20180067428 A | 6/2018 |
| KR | 20190035579 A | 4/2019 |
| KR | 101998658 B1 | 7/2019 |
| KR | 20210018757 A | 2/2021 |
| WO | 2006115272 A1 | 11/2006 |

OTHER PUBLICATIONS

Extended European Search Report including Written Opinion for Application No. 23747416.8 dated Feb. 18, 2025. 9 pages.
Vertruyen Benedicte, et al., "Spray-Drying of Electrode Materials fo1 Lithium- and Sodium-Ion Batteries", Materials, vol. 11, No. 7, Jun. 25, 2018 (Jun. 25, 2018), p. 1076, XP093007081, DOI: 10.3390/ma11071076. 51 pgs.

100μm

100μm

<u>10</u>

<u>100</u>

COMPOSITE PARTICLE INCLUDING ELECTRODE MATERIAL AND ELECTRODE FOR ELECTROCHEMICAL DEVICE INCLUDING THE SAME

CROSS-REFERENCE TO RELATED APPLICATION(S)

The present application is a national phase entry under 35 U.S.C. § 371 of International Application No. PCT/KR2023/001365, filed on Jan. 30, 2023, which claims priority from Korean Patent Application No. 10-2022-0031703, filed on Mar. 14, 2022, and Korean Patent Application No. 10-2022-0013754, filed on Jan. 28, 2022, all of which are incorporated herein by reference.

TECHNICAL FIELD

The present disclosure relates to a composite particle for a dry electrode and an electrode for an electrochemical device including the same.

BACKGROUND ART

Due to a rapid increase in use of fossil fuel, there has been an increasing need for use of substitute energy and clean energy. The most actively studied field as a part of attempts to meet such a need is the field of power generation and power storage using electrochemistry. Currently, typical examples of electrochemical devices using electrochemical energy include secondary batteries, and application thereof has been extended gradually. A lithium secondary battery as a representative of such secondary batteries has been used not only as an energy source of mobile instruments but also as a power source of electric vehicles and hybrid electric vehicles capable of substituting for vehicles, such as gasoline vehicles and diesel vehicles, using fossil fuel and regarded as one of the main causes of air pollution, recently. In addition, application of such a lithium secondary battery has been extended even to a supplementary power source of electric power through the formation into a grid.

Such a secondary battery is manufactured through an electrode forming step, an electrode assembly forming step and a formation step. In general, in the electrode forming step, a process including an electrode slurry preparing step, a step of coating the electrode slurry on an electrode current collector and a drying step is used. In addition, after the drying step, post steps, such as a pressing step, a slitting step, a winding step, or the like, are carried out. Among the steps, the electrode slurry preparing step is a step of mixing the ingredients for forming an electrode active material layer configured to carry out electrochemical reactions actually in the electrode. Particularly, an electrode active material as an essential element of the electrode is mixed with a binder used for the binding of powder particles among themselves and the adhesion to a current collector, a solvent for imparting viscosity and dispersing a powder, or the like, to prepare a slurry having flowability.

In such an electrode using a slurry coating process for forming an electrode active material layer according to the related art, the binder material in the electrode cannot be distributed uniformly in the thickness direction of the electrode, but a larger amount of the binder material is distributed intensively on the surface of the electrode active material layer. Therefore, there is a problem in that the binding force between the electrode active material layer and the current collector cannot be ensured sufficiently. This is a phenomenon resulting from the migration of the binder material toward the surface layer, as the solvent of the slurry evaporates during the drying of the slurry.

Under these circumstances, there is an increasing need for developing an electrode for an electrochemical device in which a binder material is distributed uniformly.

DISCLOSURE

Technical Problem

The present disclosure is designed to solve the problems of the related art, and therefore the present disclosure is directed to providing an electrode including an electrode active material layer in which a binder is distributed uniformly in the thickness direction thereof. The present disclosure is also directed to providing a granular particle including an electrode material showing a specific binder distribution, and a dry electrode obtained by using the same. It will be easily understood that the objects and advantages of the present disclosure may be realized by the means shown in the appended claims and combinations thereof.

Technical Solution

According to the first embodiment of the present disclosure, there is provided a granule for use in an electrode for an electrochemical device, including an electrode active material and an electrode binder, wherein the electrode active material is bound to one another by the electrode binder, the content of the electrode binder in the surface portion is higher than the content of the binder in the core portion, based on 100 wt % of the total weight of the electrode active material and the electrode binder, the surface portion is a region from the surface of the granule to 30% of the radius toward the center of the granule, and the core portion is a region other than the surface portion.

According to the second embodiment of the present disclosure, there is provided the granule as defined in the first embodiment, wherein the surface portion is a region from the surface of the granule to 20% of the radius toward the center of the granule.

According to the third embodiment of the present disclosure, there is provided the granule as defined in the first or the second embodiment, wherein the surface portion is a region from the surface of the granule to 10% of the radius toward the center of the granule.

According to the fourth embodiment of the present disclosure, there is provided the granule as defined in any one of the first to the third embodiments, which has an aspect ratio of 0.5-1.0.

According to the fifth embodiment of the present disclosure, there is provided the granule as defined in any one of the first to the fourth embodiments, which has an aspect ratio of 0.75-1.0.

According to the sixth embodiment of the present disclosure, there is provided the granule as defined in any one of the first to the fifth embodiments, which has a particle diameter ($D_{50}$) of 0.1-1,000 μm.

According to the seventh embodiment of the present disclosure, there is provided the granule as defined in any one of the first to the sixth embodiments, which includes two types or more of electrode active materials.

According to the eighth embodiment of the present disclosure, there is provided an electrode for an electrochemical device, including: a current collector; and an electrode active material layer disposed on the current collector, wherein the electrode active material layer includes an electrode active material and an electrode binder, and the granule is introduced to the electrode active material layer and integrated therein in a layered structure.

According to the ninth embodiment of the present disclosure, there is provided the electrode for an electrochemical device as defined in the eighth embodiment, wherein the electrode active material layer has a multilayer structure including two or more unit active material layers stacked therein.

According to the tenth embodiment of the present disclosure, there is provided the electrode for an electrochemical device as defined in the eighth or the ninth embodiment, wherein the electrode active material layer shows a difference of 10 wt % or less between the content (wt %) of the binder based on 100 wt % of the upper portion and the content (wt %) of the binder based on 100 wt % of the lower portion, when the electrode active material layer is divided into the upper portion and the lower portion based on the point corresponding to 50% of the thickness of the electrode active material layer from the current collector.

According to the eleventh embodiment of the present disclosure, there is provided the electrode for an electrochemical device as defined in any one of the eighth to the tenth embodiment, wherein the electrode active material layer shows a difference of 10 wt % or less between the content (wt %) of the binder in a region from the current collector to 15% of the thickness of the electrode active material layer toward the electrode surface layer portion and the content (wt %) of the binder in a region from the electrode active material layer surface portion to 15% of the thickness of the electrode active material layer toward the current collector.

According to the twelfth embodiment of the present disclosure, there is provided the electrode for an electrochemical device as defined in any one of the eighth to the eleventh embodiment, wherein the current collector includes a primer layer disposed on at least one surface thereof, and the primer layer at least partially or totally covers the surface and includes a second conductive material and a second binder.

According to the thirteenth embodiment of the present disclosure, there is provided an electrochemical device including a positive electrode, a negative electrode and a separator interposed between the positive electrode and the negative electrode, wherein the negative electrode is the electrode as defined in any one of the eighth to the twelfth embodiments.

Advantageous Effects

The granule according to the present disclosure has a higher binder content in the surface portion, and thus detachment of the granule from the electrode active material layer is reduced, when a planarization process, such as calendering, is carried out after applying the granule to a current collector to form an electrode active material layer. Therefore, contamination of a device (e.g. calendering roller) used in the planarization process is reduced. In addition, when an electrode is manufactured by using the granule, the resultant electrode shows a uniform distribution of the binder in the thickness direction of the electrode active material layer. As a result, it is possible to provide excellent adhesion between the electrode active material layer and the current collector and to improve the shape stability of the electrode active material layer.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
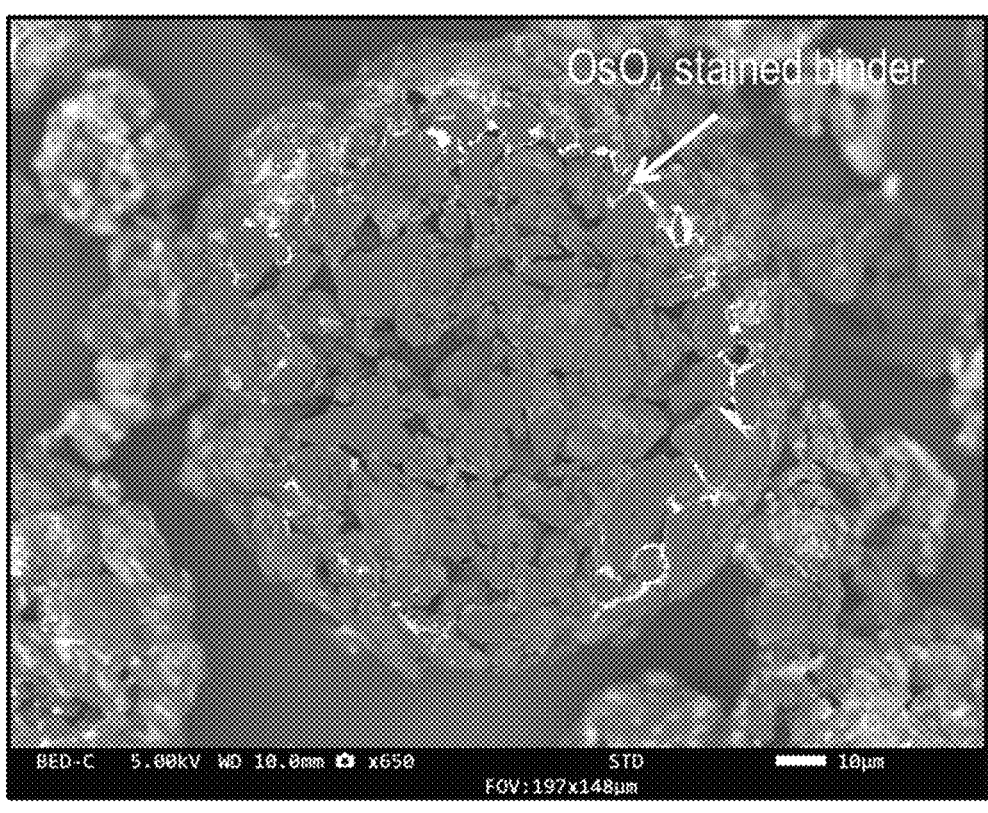
FIG. 1 is a scanning electron microscopic (SEM) image of the granule according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

The specific terms used in the present disclosure are for convenience and are not limitative. It is apparent to those skilled in the art that the terms showing directions such as 'top', 'bottom', 'left', 'right', 'front', 'rear', 'inside' and 'outside' may be used to describe the relative positions or directions between constitutional element, not absolute locations, or may refer to positions or directions in drawings where reference has been made. In addition to these terms themselves, the terms include words including them, their derivatives, and words of similar meanings.

As used herein, the term 'glass transition temperature (Tg)' is determined by the conventional method known to those skilled in the art, and for example, may be determined by differential scanning calorimetry (DSC).

As used herein, the term 'porosity' means a volume occupied by pores based on the total volume of a structure, is expressed in the unit of percentage (%), and may be used exchangeably with the terms, such as pore ratio, porous degree, or the like. According to the present disclosure, the method for determining porosity is not particularly limited. According to an embodiment of the present disclosure, the porosity may be determined by the Brunauer-Emmett-Teller (BET) method using nitrogen gas or Hg porosimetry and according to ASTM D-2873. Further, the net density of a separator may be calculated from the density (apparent density) of the separator and the compositional ratio of ingredients contained in the separator and density of each ingredient, and the porosity of the separator may be calculated from the difference between the apparent density and the net density.

As used herein, the term 'average particle diameter $(D_{50})$' refers to the particle diameter at the point of 50% in the particle number accumulated distribution as a function of particle diameter. The particle diameter may be determined by using the laser diffraction method. Particularly, a powder to be analyzed is dispersed in a dispersion medium and introduced to a commercially available laser diffraction particle size analyzer (e.g. Microtrac S3500) to measure a difference in diffraction pattern depending on particle size, when the particles pass through laser beams, and then particle size distribution can be calculated. Then, $D_{50}$ may be determined by calculating the particle diameter at the point of 50% in the particle number accumulated distribution depending on particle diameter in the analyzer system.

Herein, the 'thickness' of each layer contained in the electrode may be a value measured by any known method for measuring thickness. For example, the thickness may be determined by using a thickness gauge (VL-50S-B, available from Mitutoyo), but is not limited thereto.

As used herein, the term 'specific surface area' may be a value determined by any known method for determining a specific surface area. For example, the specific surface area may be determined by a fluidization method or a fixing method, but is not limited thereto.

The present disclosure relates to a granule for an electrode, and an electrode for an electrochemical device formed by integrating the granule(s) in a layered structure by pressurization. According to the present disclosure, the electrochemical device includes any device which carries out electrochemical reaction, and particular examples thereof include all types of primary batteries, secondary batteries, fuel cells, solar cells or capacitors, such as super capacitor devices. Preferably, the electrochemical device may be a secondary battery, more preferably, a lithium-ion secondary battery.

<Granule>

Hereinafter, the granule for an electrode according to the present disclosure will be explained in detail. According to the present disclosure, the granule may be provided in the form of a composite particle including an electrode active material and an electrode binder, and an optional ingredient added as necessary. According to an embodiment of the present disclosure, the granule may be a secondary particle formed by binding and granulating two or more electrode active material particles to each other by the electrode binder. According to the present disclosure, the electrode active material may refer to an assembly of particles, wherein each particle of the electrode active material may have a diameter of 0.05-2 μm. According to an embodiment of the present disclosure, the electrode active material may be present in an amount of 80 wt % or more, or 90 wt % or more, based on the total weight of the granule, while the electrode binder may be present in an amount of 20 wt % or less, or 10 wt % or less, based on the total weight of the granule. According to an embodiment of the present disclosure, the granule may further include an electrode conductive material as an optional ingredient, if necessary. The electrode conductive material may be present in an amount of 0.1-20 wt %, preferably 0.1-10 wt %, based on 100 wt % of the granule. For example, the conductive material may be present in an amount of about 0.1-5 wt % in the granule.

According to an embodiment of the present disclosure, the content of the electrode active material in the granule may be 85-98 wt %. Within the above-defined range, the content of the electrode binder may be 0.5-10 wt %, and the content of the electrode conductive material may be 0.5-5 wt %. According to another embodiment of the present disclosure, the content of the electrode active material may be 90-98 wt %, the content of the electrode binder may be 0.5-5 wt %, and the content of the electrode conductive material may be 0.5-5 wt %.

Figure 17:
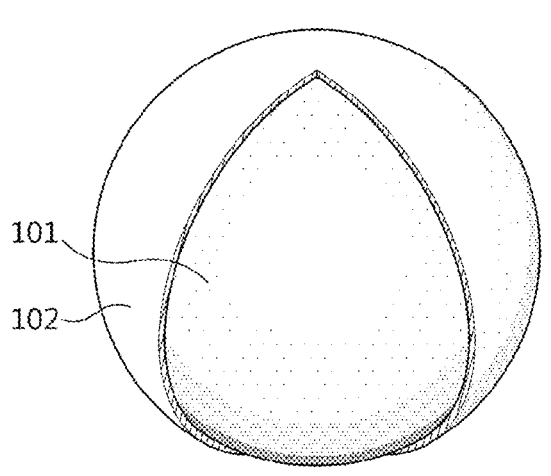
FIG. 17 is a schematic view illustrating the surface portion of the granule according to an embodiment of the present disclosure separately from the core portion thereof.

FIG. 17 is a schematic view illustrating the surface portion and the core portion in the granule according to the present disclosure. Referring to FIG. 17, in the granule according to the present disclosure, the amount of the electrode binder contained in the surface portion 102 of the granule is larger than the amount of the electrode binder contained in the core portion 101 of the granule. Herein, the amount of the binder may refer to the weight or volume thereof.

In combination with this, or independently from this, in the granule, the content (wt %) $(B_s/G_t)$ of the electrode binder contained in the surface portion 102 of the granule based on 100 wt % of the total weight of the granule is higher than the content (wt %) $(B_c/G_t)$ of the electrode binder contained in the core portion 101 of the granule based on 100 wt % of the total weight of the granule. Herein, $B_c$ refers to the weight of the binder contained in the core portion, $B_s$ refers to the weight of the binder contained in the surface portion, and $G_t$ refers to the total weight of the granule.

In combination with this, or independently from this, in the granule, the content (vol %) ($B_s/G_t$) of the electrode binder contained in the surface portion 102 of the granule based on 100 vol % of the total volume of the granule is higher than the content (vol %) ($B_c/G_t$) of the electrode binder contained in the core portion 101 of the granule based on 100 vol % of the total volume of the granule. Herein, $B_c$ refers to the volume of the binder contained in the core portion, $B_s$ refers to the volume of the binder contained in the surface portion, and $G_t$ refers to the total volume of the granule.

Herein, the surface portion may refer to a region near the surface of the granule and ranging from the surface of the granule to a predetermined depth in the direction toward the center of the granule. The core portion refers to the portion other than the surface portion. Particularly, according to an embodiment of the present disclosure, the surface portion may refer to a surface region from the surface of the granule to 30%, 20%, 15%, 10% or 5% of the radius toward the center of the granule. Preferably, the surface portion may refer to a surface region from the surface of the granule to 20% of the radius toward the center of the granule.

Meanwhile, according to an embodiment of the present disclosure, the surface portion may refer to a region between the surface of the granule and 70% or more of the radius toward the outside of the granule from the center of the granule. For example, according to an embodiment of the present disclosure, the surface portion may refer to a region between the surface of the granule and 80% or more, 85% or more, 90% or more, or 95% or more of the radius.

According to an embodiment of the present disclosure, the center of the granule may refer to a point corresponding to ½ of the largest diameter of the granule. According to the present disclosure, the radius may refer to a distance from the center of the granule to each point of the granule surface. According to an embodiment of the present disclosure, the surface portion and the core portion may be differentiated from each other based on the point having the same distance from each surface of the granule along each radius, particularly, the points ranging from the surface to 30%, 20%, 10%, 5% or 1% of the corresponding radius.

According to an embodiment of the present disclosure, in a region between the granule surface and 90% or more of the radius from the center of the granule, the content of the electrode binder may be 50 wt % or more, 60 wt % or more, 70 wt % or more, 80 wt % or more, or 90 wt % or more, based on 100 wt % of the total weight of the granule in the corresponding region.

According to another embodiment of the present disclosure, in a region between the granule surface and 95% or more of the radius from the center of the granule, the content of the electrode binder may be 50 wt % or more, 60 wt % or more, 70 wt % or more, 80 wt % or more, or 90 wt % or more, based on 100 wt % of the total weight of the granule in the corresponding region.

According to still another embodiment of the present disclosure, in a region between the granule surface and 99% or more of the radius from the center of the granule, the content of the electrode binder may be 50 wt % or more, 60 wt % or more, 70 wt % or more, 80 wt % or more, or 90 wt % or more, based on 100 wt % of the total weight of the granule in the corresponding region.

According to an embodiment of the present disclosure, in a region between the granule surface and 90% or more of the radius from the center of the granule, the content of the electrode binder may be 50 vol % or more, 60 vol % or more, 70 vol % or more, 80 vol % or more, or 90 vol % or more, based on 100 vol % of the total volume of the granule in the corresponding region.

According to another embodiment of the present disclosure, in a region between the granule surface and 95% or more of the radius from the center of the granule, the content of the electrode binder may be 50 vol % or more, 60 vol % or more, 70 vol % or more, 80 vol % or more, or 90 vol % or more, based on 100 vol % of the total volume of the granule in the corresponding region.

According to still another embodiment of the present disclosure, in a region between the granule surface and 99% or more of the radius from the center of the granule, the content of the electrode binder may be 50 vol % or more, 60 vol % or more, 70 vol % or more, 80 vol % or more, or 90 vol % or more, based on 100 vol % of the total volume of the granule in the corresponding region.

According to an embodiment of the present disclosure, in a granule surface region between the surface of the granule and 10% of the radius from the surface of the granule, the content of the electrode binder may be 50 wt % or more, 60 wt % or more, 70 wt % or more, 80 wt % or more, or 90 wt % or more, based on 100 wt % of the total weight of the granule in the corresponding region.

According to another embodiment of the present disclosure, in a granule surface region between the surface of the granule and 5% of the radius from the surface of the granule, the content of the electrode binder may be 50 wt % or more, 60 wt % or more, 70 wt % or more, 80 wt % or more, or 90 wt % or more, based on 100 wt % of the total weight of the granule in the corresponding region.

According to still another embodiment of the present disclosure, in a granule surface region between the surface of the granule and 1% of the radius from the surface of the granule, the content of the electrode binder may be 50 wt % or more, 60 wt % or more, 70 wt % or more, 80 wt % or more, or 90 wt % or more, based on 100 wt % of the total weight of the granule in the corresponding region.

According to an embodiment of the present disclosure, in a granule surface region between the surface of the granule and 10% of the radius from the surface of the granule, the content of the electrode binder may be 50 vol % or more, 60 vol % or more, 70 vol % or more, 80 vol % or more, or 90 vol % or more, based on 100 vol % of the total volume of the granule in the corresponding region.

According to another embodiment of the present disclosure, in a granule surface region between the surface of the granule and 5% of the radius from the surface of the granule, the content of the electrode binder may be 50 vol % or more, 60 vol % or more, 70 vol % or more, 80 vol % or more, or 90 vol % or more, based on 100 vol % of the total volume of the granule in the corresponding region.

According to still another embodiment of the present disclosure, in a granule surface region between the surface of the granule and 1% of the radius from the surface of the granule, the content of the electrode binder may be 50 vol % or more, 60 vol % or more, 70 vol % or more, 80 vol % or more, or 90 vol % or more, based on 100 vol % of the total volume of the granule in the corresponding region.

FIG. 1 is a schematic view illustrating the scanning electron microscopic (SEM) image of the granule according to an embodiment of the present disclosure. Referring to FIG. 1, a surface region is identified to have a high content of binder from the surface of the granule to a predetermined depth toward the center of the granule, and the portion other than the surface region, i.e. the core portion (central portion) surrounded with the surface portion shows a lower distribution of the binder as compared to the surface portion.

The granule will be explained in more detail. The granule may include a core portion containing a plurality of electrode active material particles; and a surface portion disposed totally or partially in the outside of the core portion and containing an electrode binder by which the electrode active material particles are bound to one another. In other words, in the core portion of the granule, a plurality of electrode active material particles form an aggregate while they are in contact with one another through surface contact, linear contact, dot-like contact, or two or more contact modes of them. In addition, in the surface portion of the granule, the electrode binder can fix and bind the electrode active material particles of the core portion of the granule to one another, while being disposed partially or totally in the outside of the aggregate.

According to an embodiment of the present disclosure, the core portion may further include a small amount of electrode binder so that the electrode binder may function to interconnect and fix the electrode active material particles in the core portion. However, as described above, it is preferred that the content of the electrode binder in the surface portion is higher than the content of the electrode binder in the core portion.

Meanwhile, according to an embodiment of the present disclosure, the granule may have an aspect ratio of 0.5-1.0, preferably 0.75-1.0. The aspect ratio may refer to the ratio of the shorter axis length based on the longer axis length of the granule. According to another embodiment of the present disclosure, the granules may have an average aspect ratio of 0.5-1.0, preferably 0.75-1.0. In the case, the average aspect ratio may refer to the ratio of the average shorter axis length based on the average longer axis length of the granules. Herein, the average shorter axis length refers to the average value of lengths in the direction of the axis having the shortest length in the granule, and the average longer axis length refers to the average value of lengths in the direction of the axis having the longest length in the granule. When the aspect ratio of the granule satisfies the above-defined range, there is an advantage in that the granule has sufficient flowability suitable for the process.

Meanwhile, according to an embodiment of the present disclosure, the average particle diameter of the granule may be 0.1-1,000 μm on the basis of the longest diameter of the granule. According to another embodiment of the present disclosure, the average particle diameter ($D_{50}$) of the granules may range from 0.1 μm to 1,000 μm.

<Dry Electrode>

In another aspect of the present disclosure, there is provided an electrode for an electrochemical device, including: a current collector; and an electrode active material layer disposed on the current collector. The electrode active material layer includes an electrode active material and an electrode binder, and is formed by integrating the granules having the above-described characteristics in a layered structure by pressurization. Hereinafter, the electrode active material layer and the current collector will be explained in more detail.

<Electrode Active Material Layer>

The electrode active material layer includes an electrode active material and an electrode binder. According to the present disclosure, the electrode active material layer may be formed by integrating the granules in a layered structure by pressurization. When the granules are introduced to an electrode, they cannot retain the initial state in terms of the aspect ratio of particle diameter range due to the calendering step described hereinafter, or the like. The electrode active material layer may include the granules in an amount of 80 wt % or more, 90 wt % or more, 95 wt % or more, or 99 wt % or more, based on 100 wt % of the electrode active material layer. Meanwhile, according to an embodiment of the present disclosure, the electrode active material layer may further include an electrode active material, an electrode binder, an electrode conductive material, or the like, present in a free state, while not being granulated and incorporated to the granules. In a variant, the electrode active material layer may further include granules which do not fall within the above-defined range of aspect ratio and/or particle diameter.

The electrode active material layer has pores derived from the interstitial volumes which are spaces among the granules, and shows porous property resulting from such a structure. According to an embodiment of the present disclosure, the electrode active material layer preferably has a porosity of 20-40 vol %, considering the wettability with an electrolyte, shape stability, ion conductivity, or the like.

Meanwhile, according to an embodiment of the present disclosure, the electrode active material layer may have a thickness of 30-300 μm, but is not limited thereto.

According to another embodiment of the present disclosure, the electrode active material layer may include a single layer containing one unit active material layer.

According to still another embodiment of the present disclosure, the electrode active material layer may have a multilayer structure including two or more unit active material layers stacked therein. Herein, the electrode materials, such as the electrode active material and the electrode binder, contained in each unit active material layer may be the same or different, but the scope of the present disclosure is not limited thereto. In addition, if necessary, each layer may include an electrode conductive material, and the electrode conductive material of each layer may be the same or different.

<Electrode Active Material Layer>

In addition, according to an embodiment of the present disclosure, the electrode active material layer shows a uniform distribution of binder based on the thickness direction. According to a particular embodiment, the electrode active material layer may show a difference of 10 wt % or less between the content (wt %) of the binder based on 100 wt % of the upper portion and the content (wt %) of the binder based on 100 wt % of the lower portion, when the electrode active material layer is divided into the upper portion and the lower portion based on the point corresponding to 50% of the thickness of the electrode active material layer from the current collector. In addition, the electrode active material layer may show a difference of 10 wt % or less between the content (wt %) of the binder in a region from the current collector to 15% of the thickness of the electrode active material layer toward the electrode surface layer portion and the content (wt %) of the binder in a region from the electrode active material surface layer portion to 15% of the thickness of the electrode active material layer toward the current collector.

Such a distribution of binder may result from that the electrode active material layer according to the present disclosure is formed by the compression of the granules. As described hereinafter, the method for manufacturing an electrode according to the present disclosure is characterized by preparing granules containing electrode materials, distributing the granules on a current collector, or the like, and then carrying out pressurization so that the granules may be integrated into a layered structure. In the case of the method for manufacturing an electrode including preparation of a slurry, binder migration is induced by the evaporation of a solvent during the drying of the slurry, and thus the binder is distributed intensively on the surface portion of the electrode. However, according to the present disclosure, the method for compressing and integrating granules in a dry state is applied, while not using any solvent, and thus no binder migration occurs. Therefore, the binder shows a uniform distribution in the thickness direction.

<Electrode Materials>

According to an embodiment of the present disclosure, the electrode active material layer may include an electrode active material and an electrode binder, and may further include an electrode conductive material, if necessary. For example, the mixing ratio on the weight basis of the electrode active material, the electrode conductive material and the electrode binder in the electrode active material layer may be 80-99 parts by weight: 0.5-10 parts by weight: 0.5-10 parts by weight (electrode active material: electrode conductive material: electrode binder), particularly 90-99 parts by weight: 0.5-5 parts by weight: 0.5-10 parts by weight.

The electrode may be a positive electrode or a negative electrode.

When the electrode is a positive electrode, the electrode active material, i.e. the positive electrode active material is not particularly limited, as long as it includes a lithium transition metal oxide, a lithium metal iron phosphorus oxide or a metal oxide. Particular examples of the positive electrode active material include at least one selected from: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $Li_{1+x}(Ni_aCo_bMn_cAl_d)_{1-x}O_2$ (x is 0-0.03, a is 0.3-0.95, b is 0.01-0.35, c is 0.01-0.5, d is 0.001-0.03, a+b+c+d=1) in which Li is partially substituted with an aluminum ion; lithium metal phosphorous oxides $LiMPO_4$ (wherein M is Fe, Co, Ni or Mn); disulfide compounds; $Fe_2(MoO_4)_3$; or the like. However, the scope of the present disclosure is not limited thereto.

According to another embodiment of the present disclosure, when the electrode is used as a negative electrode, the electrode active material may be a negative electrode active material. Particular examples of the negative electrode active material include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; silicon oxides, such as SiO, SiO/C and $SiO_2$; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like. However, the scope of the present disclosure is not limited thereto.

Meanwhile, according to an embodiment of the present disclosure, the granule may include two or more different electrode active materials in one granule. The electrode active material is not particularly limited, as long as it is any one selected from the above-listed examples. For example, the granule may include artificial graphite and natural graphite as an electrode active material, wherein artificial graphite and natural graphite may be mixed at a predetermined ratio.

The electrode conductive material is not particularly limited, as long as it has conductivity while not causing any chemical change in the corresponding battery. Particular examples of the electrode conductive material include: graphite, such as natural graphite or artificial graphite; carbon black, such as acetylene black, ketjen black, channel black, furnace black, lamp black or thermal black; conductive fibers, such as carbon fibers or metal fibers; fluorocarbon; metal powder, such as, aluminum or nickel powder; conductive whisker, such as zinc oxide or potassium titanate; conductive metal oxide, such as titanium dioxide; conductive polymer such as a polyphenylene derivative; or the like. Particularly, the electrode conductive material may include at least one selected from the group consisting of activated carbon, graphite, carbon black and carbon nanotubes, and more particularly, activated carbon, with a view to homogeneous mixing of the electrode conductive material and improvement of conductivity. Meanwhile, according to an embodiment of the present disclosure, the granule may include two or more different conductive materials in one granule. For example, the granule may include carbon black and carbon nanotubes mixed at a predetermined ratio.

According to the present disclosure, the electrode binder is not particularly limited, as long as it is one used as a binder material for an electrochemical device. For example, the electrode binder may include a diene-based polymer, an acrylate-based polymer, a fluorinated polymer, a styrene-based polymer, or two or more of them.

Particular examples of the diene-based polymer include a polymer containing a conjugated diene-derived monomer unit, such as butadiene or isoprene, and hydrogenated products thereof. The ratio of the conjugated diene-derived monomer unit in the diene-based polymer may be generally 40 wt % or more, preferably 50 wt % or more, and more preferably 60 wt % or more.

Particularly, the diene-based polymer may include: a conjugated diene homopolymer, such a polybutadiene or polyisoprene; aromatic vinyl-conjugated diene copolymer, such as styrene-butadiene copolymer (SBR), optionally modified with carboxyl; vinyl cyanide-conjugated diene copolymer, such as acrylonitrile-butadiene copolymer (NBR); hydrogenated SBR, hydrogenated NBR, or the like.

The styrene-based polymer is a polymer having a styrene monomer-derived repeating unit and may include styrene homopolymer (polystyrene), styrene copolymer, or the like. Particular examples of the styrene copolymer include styrene-ethylene-butadiene copolymer, styrene-butadiene-propylene copolymer, styrene-isoprene copolymer, styrene-acrylic acid-n-butyl itaconic acid-methyl methacrylate-acrylonitrile copolymer, block copolymer, such as styrene-butadiene block copolymer, styrene-butadiene-styrene block copolymer, styrene-ethylene-butylene-styrene block copolymer, styrene-isoprene block copolymer, or styrene-ethylene-propylene-styrene block copolymer, or the like.

Particular examples of the acrylate-based polymer include polymers containing an acrylate- and/or methacrylate-derived monomer unit. The ratio of the acrylate- and/or methacrylate-derived monomer unit in the acrylate-based polymer may be generally 40 wt % or more, preferably 50 wt %

13

14 or more, more preferably 60 wt % or more. Particular examples of the acrylate-based polymer include: a cross-linked acrylate-based polymer, such as 2-ethylhexyl acrylate-methacrylic acid-acrylonitrile-ethylene glycol dimethacrylate copolymer, 2-ethylhexyl acrylate-methacrylic acid-methacrylonitrile-diethylene glycol dimethacrylate copolymer, 2-ethylhexyl acrylate-styrene-methacrylic acid-ethylene glycol dimethacrylate copolymer, butyl acrylate-acrylonitrile-diethylene glycol dimethacrylate copolymer, butyl acrylate-acrylic acid-trimethyolpropane trimethacrylate, or the like; copolymer of ethylene with (meth)acrylate, such as ethylene-methyl acrylate copolymer, ethylene-methyl methacrylate copolymer, ethylene-ethyl acrylate copolymer, ethylene-ethyl methacrylate copolymer, or the like; graft polymer containing the copolymer of ethylene with (meth)acrylate, grafted with a radical polymerizable monomer; or the like. Meanwhile, particular examples of the radical polymerizable monomer used in the graft polymer include methyl methacrylate, acrylonitrile, methacylic acid, or the like. In addition, a copolymer of ethylene with (meth)acrylic acid, such as ethylene-acrylic acid copolymer, ethylene-methacrylic acid copolymer, or the like, may be used as a dispersion type binder.

The fluorinated polymer may include a polyvinylidene-based copolymer, such as polyvinylidenme fluoride (PVDF), polytetrafluoroethylene (PTFE) or PVdF-HFP, particularly, polytetrafluoroethylene (PTFE), and more particularly, the fluorinated polymer may be polytetrafluoroethylene (PTFE).

Meanwhile, according to an embodiment of the present disclosure, the granule may include two or more different binder ingredients in one granule. For example, the granule may include styrene butadiene rubber (SBR) mixed with an acrylate-based polymer at a predetermined ratio, as a binder ingredient.

According to an embodiment of the present disclosure, when the electrode is a positive electrode, the positive electrode binder may include a fluorinated copolymer. According to a particular embodiment, the positive electrode may include PTFE among the fluorinated copolymers, and more preferably, PTFE may be contained in an amount of 60 wt % or more based on the total binder weight. Meanwhile, the positive electrode binder may further include a fluorinated copolymer other than PTFE, a styrene-based copolymer, a polyolefin-based copolymer, polyethylene oxide (PEO), an acrylate-based copolymer, or the like.

Meanwhile, according to an embodiment of the present disclosure, when the electrode is a negative electrode, the negative electrode binder may include at least one of a diene-based polymer and a styrene-based polymer in an amount of 60 wt % or more based on the total binder weight. According to a particular embodiment, the negative electrode may include a styrene-butadiene block copolymer in an amount of 60 wt % or more based on the total binder weight. Meanwhile, the negative electrode binder may further include a fluorinated copolymer, a polyolefin-based copolymer, polyethylene oxide (PEO), an acrylate-based copolymer, or the like.

Meanwhile, according to an embodiment of the present disclosure, when the electrode binder includes an electrode binder having a double bond, and for example, when the electrode is a negative electrode, the negative electrode active material layer may have a first QBR (Quantified Binder Ratio) of 2.0 or less.

The first QBR is defined by the following mathematical formula:

$$\text{First QBR}=ABs/ABf,$$

wherein, ABs represents the average value of double bond content in the negative electrode active material layer surface region from the outermost surface of the negative electrode active material layer to 15% or less of the total thickness of the negative electrode active material layer, and ABf represents the average value of double bond content in the negative electrode active material layer bottom region from the interface of the negative electrode active material layer facing the current collector to 15% or less of the total thickness of the negative electrode active material layer.

Figure 6:
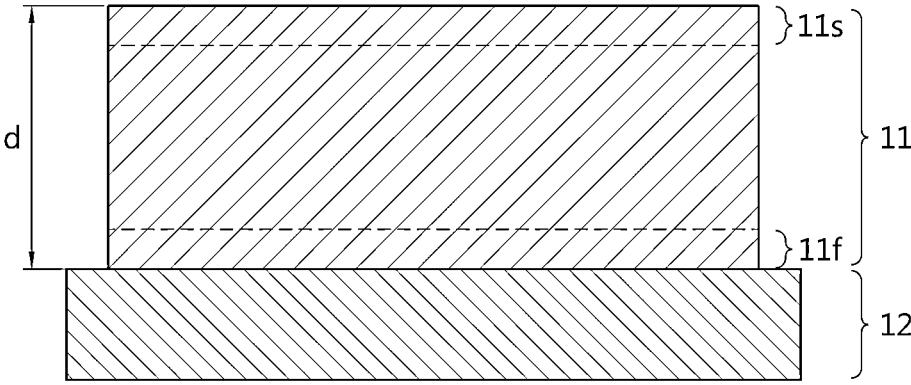
FIG. 6 is a schematic view illustrating the electrode according to an embodiment of the present disclosure.

FIG. 6 is a schematic view illustrating the electrode according to an embodiment of the present disclosure. Referring to FIG. 6, the electrode 10 includes: an electrode current collector 12; and an electrode active material layer 11 disposed on the electrode current collector 12 and containing an electrode active material and a fluorinated electrode binder.

The electrode active material layer 11 has, based on the total thickness d thereof, an electrode active material layer surface region 11s from the outermost surface of the electrode active material layer to 15% or less of the total thickness of the electrode active material layer, and an electrode active material layer bottom region 11f from the interface of the electrode active material layer facing the current collector to 15% or less of the total thickness of the electrode active material layer.

In the above mathematical formula of the first QBR, ABs represents the average value of double bond content of the binder in the negative electrode active material layer surface region 11s, and ABf represents the average value of double bond content of the binder in the negative electrode active material layer bottom region 11f.

Herein, the first QBR may be calculated by the following method.

First, an electrode, the first QBR of which is to be determined, is selected, and the section of the negative electrode is obtained by using argon ion milling. Next, an energy dispersive X-ray spectroscopy (EDS) detector of a scanning electronic microscopy (SEM) instrument is used to perform EDS mapping of the ingredients in the negative electrode active material layer of the electrode section.

Then, a line profile is extracted from the EDS mapping results in the negative electrode active material layer thickness direction, and the average value Bs of the double bond content of the binder in the electrode layer surface region and the average value Bf of the double bond content of the binder in the electrode layer bottom region are extracted from the line profile results. After that, the first QBR is calculated by using the following mathematical formula:

$$\text{First QBR}=ABs/ABf$$

Herein, the electrode active material layer surface region is a zone ranging from the outermost surface of the electrode active material layer to up to 15% of the total thickness d of the electrode active material layer in the thickness direction of the electrode active material layer, and the electrode active material layer bottom region is a zone ranging from the electrode active material layer interface facing the current collector to up to 15% of the total thickness d of the electrode active material layer.

Figure 7:
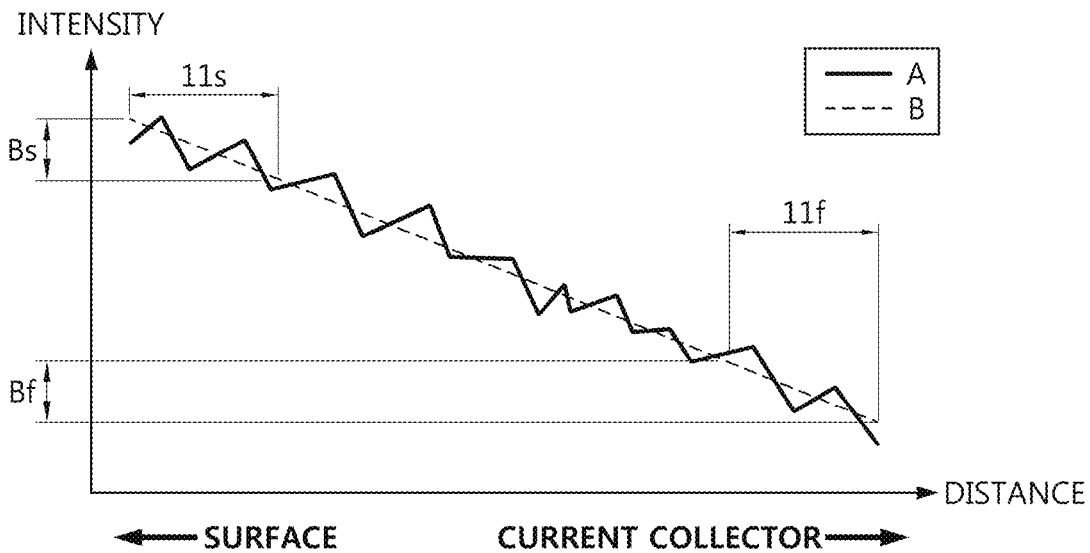
FIG. 7 is a schematic view illustrating the calculation of the QBR value of an electrode layer.

FIG. 7 is a schematic view illustrating calculation of the first QBR value of an electrode active material layer. Referring to FIG. 7, X-axis represents the thickness of the electrode active material layer, i.e. distance from the surface toward the current collector, and Y-axis represents the intensity of fluorine ingredient. Line A represents the intensity of double bond ingredients of the binder extracted through EDS mapping of double bond ingredients in the electrode active material layer of the electrode section, and line B represents a tendency line showing a tendency of line A and is plotted by the LOWESS smoothing method, i.e. through smoothing in a locally-weighted scatter plot smoother mode. In FIG. 7, Bs represents the intensity of the binder in the electrode surface portion, Bf represents the intensity of the binder in the electrode bottom portion (portion facing the current collector).

The first QBR value is a value illustrating the uniformity of the distribution of the electrode binder in the thickness direction of the electrode active material layer by means of the ratio of the content of the electrode binder contained in the surface region of the electrode active material layer based on the content of the electrode binder contained in the bottom region of the electrode active material layer. Herein, the content of the electrode binder may be inferred through the double bond ingredients contained in the electrode binder.

The first QBR value may be 2.0 or less, or 0.6-2.0, 0.9-2.0, 0.6-1.4, 0.9-1.4, or 0.9-1.1.

When the first QBR satisfies the above-defined range, the binder may not be migrated to the electrode surface, and the content of the electrode binder contained in the surface region of the electrode active material layer may not be larger than the content of the electrode binder contained in the bottom region of the electrode active material layer. In addition, the binder is distributed uniformly in the thickness direction of the electrode active material layer, and thus the adhesion between the current collector and the electrode active material layer may be improved, and the conductivity on the electrode active material layer surface and the charge/discharge rate may be increased advantageously.

Meanwhile, according to an embodiment of the present disclosure, the negative electrode may include, as a binder ingredient, a negative electrode binder having a double bond, such as styrene-butadiene copolymer, wherein the first QBR value may be 2.0 or less.

According to an embodiment of the present disclosure, when the electrode binder includes a fluorinated binder as a binder ingredient, and for example, when the electrode is a positive electrode, the positive electrode active material layer may have a second QBR (Quantified Binder Ratio), wherein the second QBR is defined by the following mathematical formula:

$$\text{Second QBR} = CBs/CBf,$$

wherein, CBs represents the average value of fluorine content in the electrode layer surface region from the outermost surface of the electrode active material layer to 15% or less of the total thickness of the electrode active material layer, and CBf represents the average value of fluorine content in the electrode active material layer bottom region from the interface of the electrode active material layer facing the current collector to 15% or less of the total thickness of the electrode active material layer.

The second QBR value may be 1.1 or less. According to an embodiment of the present disclosure, the second QBR value may be 0.95 or more, 0.97 or more, 1.03 or less, 1.05 or less, or 0.95-1.05.

When the second QBR satisfies the above-defined range, the fluorinated electrode binder may not be migrated to the electrode surface, and the content of the fluorinated electrode binder contained in the surface region of the electrode active material layer may not be larger than the content of the fluorinated electrode binder contained in the bottom region of the electrode active material layer. In addition, the binder is distributed uniformly in the thickness direction of the electrode active material layer, and thus the adhesion between the current collector and the electrode active material layer may be improved, and the conductivity on the electrode active material layer surface and the charge/discharge rate may be increased advantageously.

Meanwhile, according to an embodiment of the present disclosure, the positive electrode may include, as a binder ingredient, a fluorinated binder, wherein the second QBR value may be 1.1 or less.

Meanwhile, according to the present disclosure, the electrode binder may include a diene-based polymer and a crosslinked acrylate-based polymer in order to obtain an active material layer having excellent binding property to a current collector or excellent surface smoothness and to manufacture an electrode for an electrochemical device having a high electrostatic capacity and low internal resistance.

Although the shape of the electrode binder is not particularly limited, the electrode binder preferably has a particle-like shape, since the particle-like electrode binder shows high binding property and can inhibit deterioration of the resultant electrode caused by degradation of the electrostatic capacity or repetition of charge/discharge. For example, the particle-like electrode binder includes a binder containing dispersible binder particles dispersed in water, as in the case of latex, or a powdery binder obtained by drying the dispersion. Such a particle-like binder may be used preferably in a negative electrode.

Meanwhile, a filler as an ingredient for inhibiting swelling of the electrode active material layer may be further introduced optionally to the electrode active material layer. The filler is not particularly limited, as long as it is a fibrous material, while not causing any chemical change in the corresponding battery. Particular examples of the filler include: olefinic polymers, such as polyethylene or polypropylene; fibrous materials, such as glass fibers or carbon fibers; or the like.

The current collector is not particularly limited, as long as it has high conductivity, while not causing any chemical change in the corresponding battery. Particular examples of the current collector include stainless steel, aluminum, nickel, titanium, baked carbon, copper or stainless steel surface-treated with carbon, nickel, titanium, silver, or the like. In addition, fine surface irregularities may be formed on the surface of the current collector to enhance the binding force with the electrode active material. The current collector may be used in various shapes, including a film, a sheet, a foil, a net, a porous body, a foamed body, a non-woven web, or the like.

Meanwhile, according to an embodiment of the present disclosure, a conductive primer may be totally or partially coated on the current collector.

The primer layer may include a binder (also referred to as a second binder hereinafter) for a primer layer and a conductive material (also referred to as a second conductive material) for a primer layer, and the sum of the content of the second binder and the content of the second conductive material may be 90 wt % or more in the primer layer.

The electrode according to an embodiment of the present disclosure includes an electrode active material layer containing the granules, and may further include the primer layer containing the second binder and the second conductive material, wherein the sum of the content of the second binder and the content of the second conductive material is 90 wt % or more. In this manner, it is possible to ensure the stability of the primer layer and to provide excellent physical properties, such as adhesion and life characteristics. However, the scope of the present disclosure is not limited thereto.

According to an embodiment of the present disclosure, the primer layer includes the second binder and the second conductive material, and may further include a dispersant.

According to another embodiment of the present disclosure, the primer layer includes the second binder and the second conductive material, and may not substantially include a dispersant.

According to still another embodiment of the present disclosure, the second binder is not particularly limited, as long as it is a known binder used for a primer layer.

According to still another embodiment of the present disclosure, the second binder may include a polymer capable of ensuring the stability of the primer layer with time, preferably. Particularly, the second binder may have a glass transition temperature (Tg) of 45° C. or lower.

According to still another embodiment of the present disclosure, particular examples of the second binder include styrene butadiene rubber (SBR), butadiene rubber (BR), nitrile butadiene rubber (NBR), styrene butadiene styrene block copolymer (SBS), styrene ethylene butadiene block copolymer (SEB), styrene-(styrene butadiene)-styrene block copolymer, natural rubber (NR), isoprene rubber (IR), ethylene-propylene-diene terpolymer (EPDM), poly(ethylene-co-propylene-co-5-methylene-2-norbornene), polytetrafluoroethylene (PTFE), polyvinylidene fluoride, polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene, polypropylene, polyethylene-co-vinyl acetate, polyethylene oxide, polypropylene oxide, polyarylate, cyanoethyl pullulan, cyanoethyl polyvinyl alcohol, or two or more of them. More particularly, the second binder may include styrene butadiene rubber (SBR), nitrile butadiene rubber (NBR), polymethyl methacrylate, polyethylhexyl acrylate, polybutyl acrylate, or two or more of them.

According to still another embodiment of the present disclosure, the second binder may be any one selected from the above-listed examples and having the above-defined range of glass transition temperature, or a mixture of two or more of them.

According to still another embodiment of the present disclosure, the second binder may include styrene butadiene rubber (SBR) having a glass transition temperature (Tg) of −40° C. to 45° C., nitrile butadiene rubber (NBR) having a glass transition temperature (Tg) of −40 to 45° C., or a mixture thereof.

According to an embodiment of the present disclosure, the second conductive material may have a specific surface area of 30-1,400 m²/g and a spherical shape. Herein, the primary particles of the conductive material having a spherical shape may have a particle size of 10-100 nm, particularly 15-70 nm, but are not limited thereto.

According to another embodiment of the present disclosure, the second conductive material may have a specific surface area of 10-400 m²/g and a tubular shape. Herein, the section of the conductive material having a tubular shape may have a diameter of 0.1-3 nm, particularly 0.3-1.5 nm in the direction orthogonal to the longitudinal direction, but is not limited thereto.

The second conductive material is not particularly limited, as long as it has conductivity while not causing any chemical change in the corresponding battery. Particular examples of the conductive material include: graphite, such as natural graphite or artificial graphite; carbon black-based carbonaceous compound, such as carbon black, acetylene black, ketjen black, channel black, furnace black, lamp black or thermal black; conductive fibers, such as carbon fibers or metal fibers; fluorocarbon; metal powder, such as aluminum or nickel powder; conductive whisker, such as zinc oxide or potassium titanate; conductive metal oxide, such as titanium dioxide; conductive polymer such as a polyphenylene derivative; or the like. Particularly, the second conductive material may include activated carbon, graphite, carbon black, carbon nanotubes or a mixture of two or more of them, and more particularly, activated carbon, with a view to homogeneous mixing of the conductive material and improvement of conductivity.

According to an embodiment of the present disclosure, the primer layer includes the above-mentioned composition and may have a thickness of 300 nm to 1.5 μm, particularly 700 nm to 1.3 μm, but is not limited thereto.

<Method for Preparing Granule>

According to an embodiment of the present disclosure, the granule contained in the active material layer may be prepared by the method including the steps of: mixing an electrode active material with an electrode binder to prepare a slurry; and spray drying the slurry.

First, the electrode active material and the electrode binder, and optionally, an additional conductive material or an additive are dispersed or dissolved in a dispersion medium (solvent for the negative electrode binder) to obtain a slurry including the electrode active material and the electrode binder optionally with the electrode conductive material and/or other additives, dispersed or dissolved therein.

The dispersion medium used to obtain the slurry may be water, most suitably, but an organic solvent may also be used. Particular examples of the organic solvent include: an alkyl alcohol, such as methyl alcohol, ethyl alcohol or propyl alcohol; alkyl ketone, such as acetone or methyl ethyl ketone; ether, such as tetrahydrofuran, dioxane or diglyme; amide, such as diethylformamide, dimethylacetoamide, N-methyl-2-pyrrolidone (also referred to as NMP hereinafter) or dimethyl imidazolidinone; sulfur-based solvent, such as dimethyl sulfoxide or sulfurane; or the like. However, the organic solvent is an alcohol, preferably. When an organic solvent having a lower boiling point as compared to water is used in combination, it is possible to increase the drying rate during fluidization granulation. In addition, since the dispersibility or solubility of the negative electrode binder may be changed, the viscosity or flowability of the slurry may be controlled depending on the amount or type of the dispersion medium to improve the production efficiency.

The amount of the dispersion medium used when preparing the slurry may be generally such an amount that the solid content of the slurry may be 1-50 wt %, 5-50 wt % or 10-30 wt %.

The method or order of dispersing or dissolving the electrode active material, the electrode binder, or the like, is not particularly limited. For example, such methods may include a method of adding the electrode active material and the electrode binder to the dispersion medium and mixing them, a method of dissolving or dispersing the electrode binder in the dispersion medium, adding the electrode active material finally and mixing them, or the like. When the slurry includes a conductive material and/or an additive, such ingredients may be introduced during the introduction of the electrode active material. Particular examples of the mixing means may include a mixing system, such as a ball mill, a sand mill, a bead mill, a pigment dispersion system, a stone mill, an ultrasonic dispersion system, a homogenizer, a planetary mixer, or the like. For example, the mixing may be carried out at a temperature ranging from room temperature to 80° C. for 10 minutes to several hours.

Next, the slurry is spray dried. The spray drying method includes spraying and drying the slurry in hot air. The spraying processes used in a system for spray drying include a rotary disc process, a nozzle pressurization process, or the like. The rotary disc process includes introducing the slurry substantially to the center of a disc rotating at a high speed, allowing the slurry to be located outside of the disc by the centrifugal force of the disc, and drying the slurry at that time in a fog-like phase. The disc rotation speed depends on the size of the disc, but generally may be 5,000-35,000 rpm, preferably 15,000-30,000 rpm. Meanwhile, the nozzle pressurization process includes spraying a high-pressure fluid, such as air or another type of liquid, in combination, while allowing the slurry to pass through a thin nozzle, to spray and dry the slurry in a fog-like phase.

According to an embodiment of the present disclosure, the hot air temperature may be controlled to 80-250° C. based on the reactor inlet temperature (upon the introduction) in terms of formation of a granule structure having a high content of electrode binder on the surface. According to an embodiment of the present disclosure, the hot air temperature may be controlled preferably to 175-220° C., more preferably 180-220° C., considering the gradient of binder content and aspect ratio. In the spray drying method, the method for hot air suction is not particularly limited. For example, the hot air suction method may include a method using hot air flowing in parallel with the direction of spraying in the horizontal direction, a method of spraying slurry near the top of a drying tower and allowing the sprayed slurry to drop together with hot air, a method of allowing the sprayed drops to be in contact with hot air in a counter-current mode, a method of allowing the sprayed drops to flow in parallel with initial hot air first, and then to drop by gravity so that they may be contact with hot air in a counter-current mode, or the like. Meanwhile, according to an embodiment of the present disclosure, the outlet temperature (temperature of hot air discharged from the reactor) of the reactor in the spray drying process may be controlled to 90-130° C.

When the outlet temperature or the difference, ΔT, between the inlet temperature and the outlet temperature is low, it is not possible to carry out drying sufficiently, and thus particles containing a large amount of residual solvent are formed, spherical particles having a uniform shape cannot be formed, and the granules may be agglomerated or may be formed into an amorphous state. Meanwhile, when the inlet temperature is excessively high and ΔT is large, over-drying occurs and granulation cannot be accomplished, and particles having an excessively small $D_{50}$ and a low aspect ratio may be formed. Therefore, in order to realize a high aspect ratio, to inhibit agglomeration of the binder and to control the particle size to a suitable level, it is required to control the inlet temperature and the outlet temperature to a suitable range.

In addition, the product, i.e. granule, obtained from the spray drying, may be optionally heat treated in order to cure the surface thereof, wherein the heat treatment temperature may be generally 80-300° C.

<Method for Manufacturing Electrode>

According to an embodiment of the present disclosure, the method for manufacturing an electrode includes the steps of: applying a plurality of granules onto a current collector; and pressurizing the applied granules to form an electrode active material layer.

The granules prepared by the method as described above are applied onto a current collector. Herein, as described above, the primer layer containing the second conductive material and the second binder may be provided totally or partially on at least one surface of the current collector.

According to an embodiment of the present disclosure, the granules prepared as described above may be supplied to a roll-type pressurization molding system through a supply device, such as a screw feeder, to form an active material layer, wherein the current collector may be provided to the roll of the pressurization molding system, while supplying the granules at the same time so that the active material layer may be laminated directly on the current collector. In a variant, the granules may be applied onto the current collector and adjusted to a uniform thickness by using a blade, or the like, and then molded through a pressurization system to form the electrode active material layer.

In the above-mentioned methods, the temperature during the roll pressurization molding is generally 0-200° C. and is preferably higher than the melting point or glass transition temperature of the electrode binder, and more preferably, may be at least 20° C. higher than the melting point or glass transition temperature of the electrode binder. The molding rate in the roll pressurization molding may be generally 0.1-20 m/min., or 1-10 m/min. In addition, the press linear pressure between rolls may be 0.2-30 kN/cm, or 0.5-10 kN/cm.

In order to eliminate a deviation in thickness of the molded electrode and to increase the density of the electrode active material layer so that the electrode may be provided with a high capacity, pressurization may be further carried out, if necessary. The post-pressurization method is generally carried out by a roll pressing process. In the roll pressing process, two cylindrical rolls are allowed to stand longitudinally in parallel with each other at a small interval, and to rotate in the opposite direction to pressurize the electrode inserted between the rolls. The roll may be controlled in temperature, and for example, may be heated or cooled.

According to another embodiment of the present disclosure, there are provided a secondary battery which includes an electrode assembly including a positive electrode, a negative electrode and a separator, wherein the electrode assembly is received in a battery casing (e.g. a cylindrical casing, prismatic casing, pouch, or the like) together with a lithium-containing nonaqueous electrolyte, and an energy storage system including the secondary battery as a unit cell. Herein, at least one of the positive electrode and the negative electrode may be the electrode disclosed herein.

Particular examples of the separator may include a porous polymer film used conventionally as a separator, such as a porous polymer film made of a polyolefin-based polymer, including ethylene homopolymer, propylene homopolymer, ethylene/butene copolymer, ethylene/hexene copolymer or ethylene/methacrylate copolymer, or a laminate thereof. In addition, an insulating thin film having high ion permeability and mechanical strength may be used. The separator may include a safety reinforced separator (SRS), the surface of which is coated with a thin layer of ceramic material. Further, a conventional porous non-woven web, such as a non-woven web made of high-melting point glass fibers, polyethylene terephthalate fibers, or the like, may be used. However, the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfurane, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto to finish a secondary battery. In a variant, the lithium secondary battery may be obtained by stacking the electrode assemblies, impregnating the stack with the electrolyte, and introducing the resultant product to a battery casing, followed by sealing.

Herein, since the structures of the secondary battery and the energy storage system are well known to those skilled in the art, description thereof will be omitted in the present disclosure.

Mode for Disclosure

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Example 1

1. Negative Electrode (1) Preparation of Current Collector Provided with Primer Layer First, 30 parts by weight of carbon black (specific surface area: 30 m²/g, particle size (70 nm)) as a second conductive material, 69 parts by weight of styrene-butadiene rubber (SBR) (Tg: −15° C.) as a second binder, and 1 parts by weight of carboxymethyl cellulose (CMC) as a dispersant were mixed in water as a dispersion medium to prepare a slurry for a primer layer. Herein, the weight ratio of the conductive material, binder and dispersant in the slurry was the same as the weight ratio of the conductive material, the binder and the dispersant in primer layer to be formed subsequentially. The slurry for a primer layer had a solid content of 7 wt %.

The prepared slurry for a primer layer was applied to one surface of a copper current collector (thickness: 10 μm) and dried at 130° C. to form a primer layer on the whole surface of the copper current collector.

(2) Preparation of Granule for Negative Electrode Active Material Layer

First, 1.91 parts by weight of natural graphite having a sphericity of 0.95 and 76.5 parts by weight of artificial graphite having an average sphericity of 0.9 as negative electrode active materials, carbon black (Super C65) as a negative electrode conductive material, carboxylmethyl cellulose (daicel 2200, aqueous solution, solid content 1.5 wt %) as a negative electrode dispersant, and modified styrene butadiene copolymer (Grade name: AX-B119) as a negative electrode binder were mixed in water as a dispersion medium at a weight ratio of 95.6:1.0:1.1:2.3 to prepare a slurry having a viscosity of about 1000 cPs through a homogenizer. Herein, the slurry had a solid content of 30 wt %. In the weight ratio, carboxymethyl cellulose is calculated based on the solid content.

Figure 8:
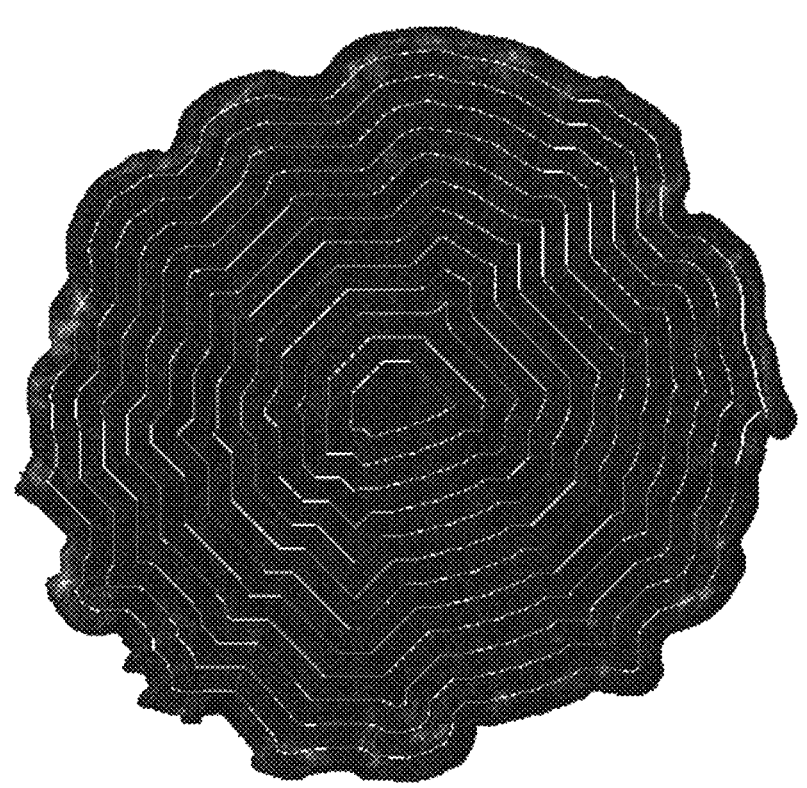
FIG. 8 shows a sectional image of the granule prepared according to Example 1.

The resultant slurry was introduced into and dried in a spray dryer together with hot air under the condition of a pressure of −40 mmH₂O. Herein, the spray dryer was controlled to an inlet temperature of 180° C., an outlet temperature of 90° C. and a rotation speed of 18,000 rpm. The resultant granules were passed through an industrial sieve to remove macropowder having a size of 150 μm or more, and micropowder having a size of less than 40 μm was separated therefrom. The separated micropowder was mixed with the granules from which only the macropowder was removed, thereby preparing granules for a negative electrode containing a larger amount of micropowder as compared to the initial granules. The granule was provided with a core portion containing a plurality of the negative electrode active material particles and the negative electrode conductive material, and a surface portion disposed outside of the core portion and containing the negative electrode binder by which the negative electrode active material is bound with the negative electrode conductive material. The resultant granules had an average particle diameter ($D_{50}$) of 66.5 μm and an aspect ratio of 0.96. FIG. 8 is a sectional image of the granule prepared according to Example 1, processed by the electron probe micro-analysis (EPMA) method as described hereinafter. The closed curves shown in the image are those plotted by connecting the points having the same distance from the surface.

(3) Manufacture of Negative Electrode

The granules prepared as described above were applied uniformly to one surface of the current collector having the primer layer by using a thickness-controlling bar to a level of 400 mg per 25 cm$^2$ of the current collector. Then, a sheeting machine, roll-to-roll hot press molding system, was used to carry out pressurization under the conditions of a pressure of 0.7 ton/cm and 60° C. at a rate of 2 m/min to form a negative electrode active material layer, thereby providing a negative electrode.

Example 2

Figure 9:
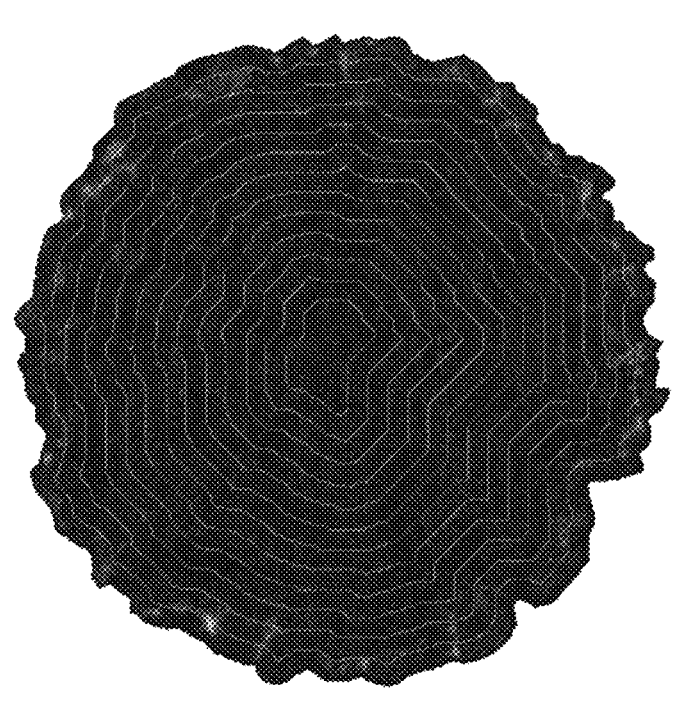
FIG. 9 shows a sectional image of the granule prepared according to Example 2.

Granules were obtained in the same manner as Example 1, except that the spray dryer was controlled to an inlet temperature of 180° C. and an outlet temperature of 130° C. The resultant granules had an average particle diameter ($D_{50}$) of 61.4 μm and an aspect ratio of 0.99. FIG. 9 shows a sectional image of the granule prepared from Example 2, as processed by the EPMA method as described hereinafter. The closed curves shown in the image are those plotted by connecting the points having the same distance from the surface.

Example 3

Figure 10:
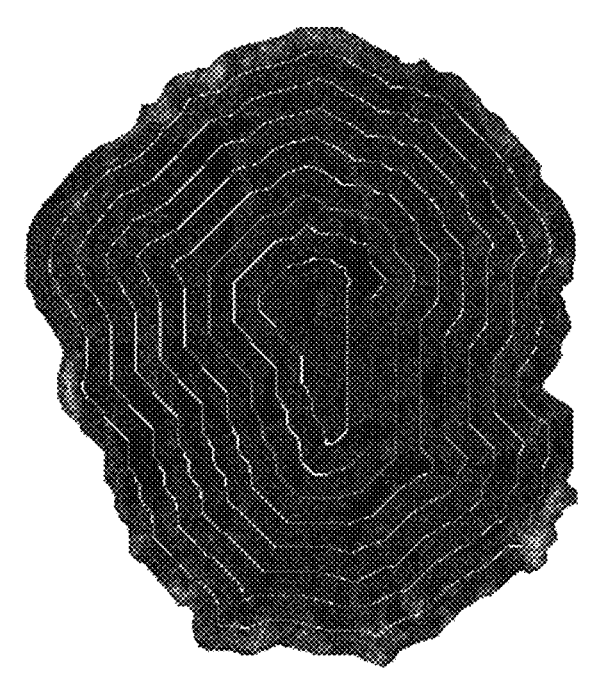
FIG. 10 shows a sectional image of the granule prepared according to Example 3.

Granules were obtained in the same manner as Example 1, except that the spray dryer was controlled to an inlet temperature of 200° C. and an outlet temperature of 110° C. The resultant granules had an average particle diameter ($D_{50}$) of 35.8 μm and an aspect ratio of 0.77. FIG. 10 shows a sectional image of the granule prepared from Example 3, as processed by the EPMA method as described hereinafter. The closed curves shown in the image are those plotted by connecting the points having the same distance from the surface.

Comparative Example 1

Figure 11:
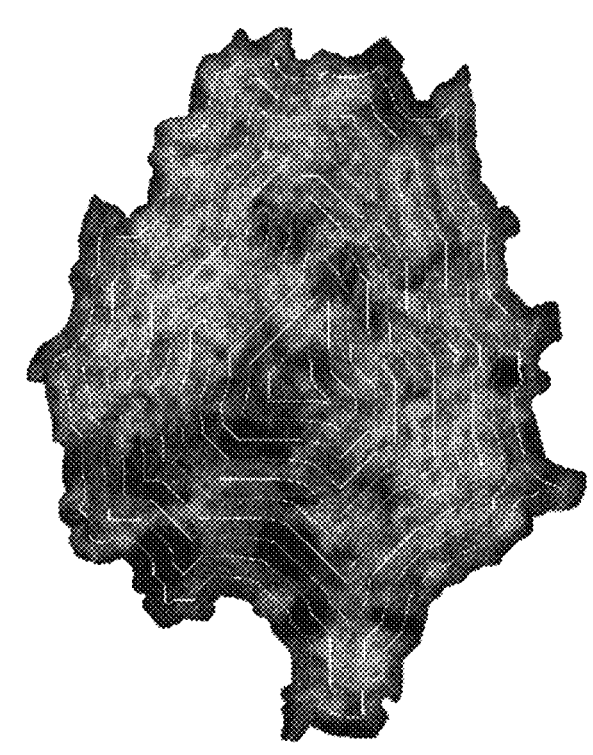
FIG. 11 shows a sectional image of the granule prepared according to Comparative Example 1.

Granules were obtained in the same manner as Example 1, except that the spray dryer was controlled to an inlet temperature of 170° C. and an outlet temperature of 70° C. The resultant granules had an average particle diameter ($D_{50}$) of 42.8 μm and an aspect ratio of 0.75. In addition, a negative electrode was obtained in the same manner as Example 1, except that the granules prepared from Comparative Example 1 were used instead of the granules prepared from Example 1. In Comparative Example 1, the granules were slightly over-dried and had an aspect ratio of 0.75 or less, and uniform spherical particles could not be formed with a large deviation among the granules. FIG. 11 shows a sectional image of the granule prepared from Comparative Example 1, as processed by the EPMA method as described hereinafter. Referring to FIG. 11, it can be seen that the binder resin (light colored) is distributed throughout the whole section of the granules. The closed curves shown in the image are those plotted by connecting the points having the same distance from the surface.

Comparative Example 2

Figure 12:
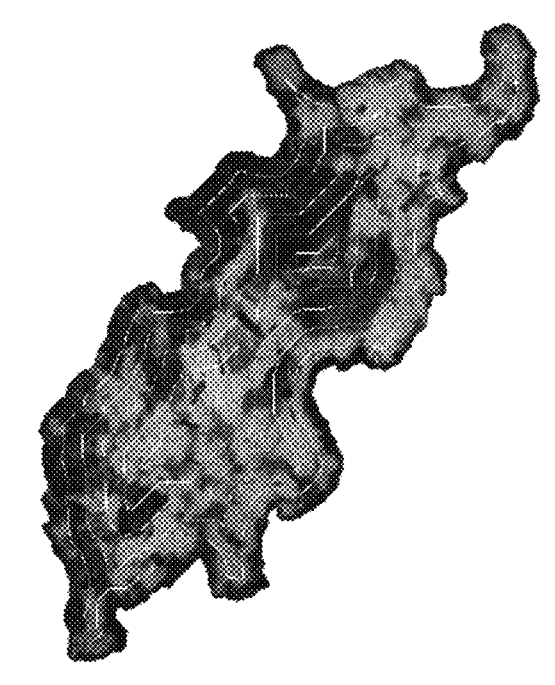
FIG. 12 shows a sectional image of the granule prepared according to Comparative Example 2.

Granules were obtained in the same manner as Example 1, except that the spray dryer was controlled to an inlet temperature of 170° C. and an outlet temperature of 140° C. The resultant granules had an average particle diameter ($D_{50}$) of 78.0 μm and an aspect ratio of 0.37. In Comparative Example 2, the solvent could not be removed sufficiently due to a small difference between the inlet temperature and the outlet temperature, thereby forming granules having a large amount of residual solvent, and thus uniform spherical particles could not be formed and the granules had a high moisture content and showed agglomeration. FIG. 12 shows a sectional image of the granule prepared from Comparative Example 2, as processed by the EPMA method as described hereinafter. Referring to FIG. 11, it can be seen that the binder resin (light colored) is distributed throughout the whole section of the granules. The closed curves shown in the image are those plotted by connecting the points having the same distance from the surface.

Comparative Example 3

Granules were obtained in the same manner as Example 1, except that the spray dryer was controlled to an inlet temperature of 230° C. and an outlet temperature of 90° C. In Comparative Example 3, over-drying occurred due to a large difference between the inlet temperature and the outlet temperature, resulting in a failure of granulation. Therefore, it was not possible to prepare granules.

Comparative Example 4

First, 19.1 parts by weight of natural graphite having a sphericity of 0.95 and 76.5 parts by weight of artificial graphite having an average sphericity of 0.9 as negative electrode active materials, 1 parts by weight of carbon black (Super C65) as a negative electrode conductive material, 2.3 parts by weight of styrene butadiene rubber (SBR) as a negative electrode binder, 1.1 parts by weight of carboxylmethyl cellulose (CMC) as a binder also functioning as a thickener, and water as a dispersion medium were mixed to prepare slurry having a solid content of 47 wt %.

The slurry was coated on one surface of copper (Cu) foil having a thickness of 10 μm, as a negative electrode current collector, and the top and bottom active material layers formed as mentioned above were pressed through a roll pressing process by using a dryer provided with a hot air blower and an IR heater. In this manner, a negative electrode provided with a negative electrode active material layer having a dry-basis loading amount per unit area of 400 mg/25 cm$^2$ was obtained.

Determination of Binder Distribution in Granule

Figure 13A:
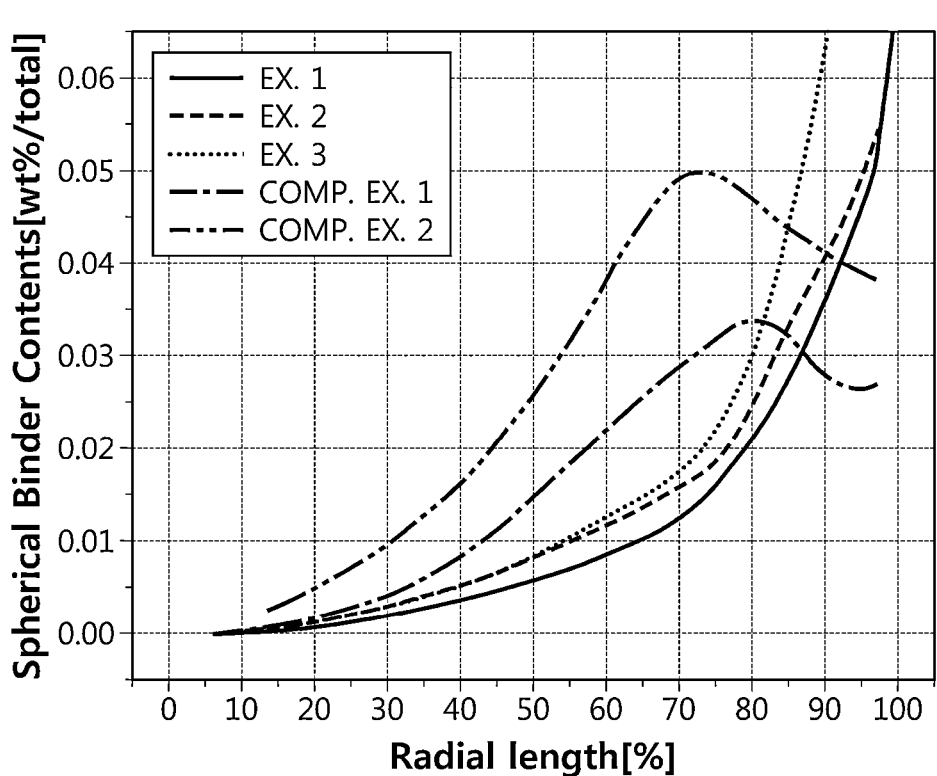
FIG. 13a and FIG. 13b are graphs illustrating the content of the binder resin from the core to the surface portion of the granule obtained according to Examples 1 and 2 and Comparative Examples 1 and 2.
Figure 13B:
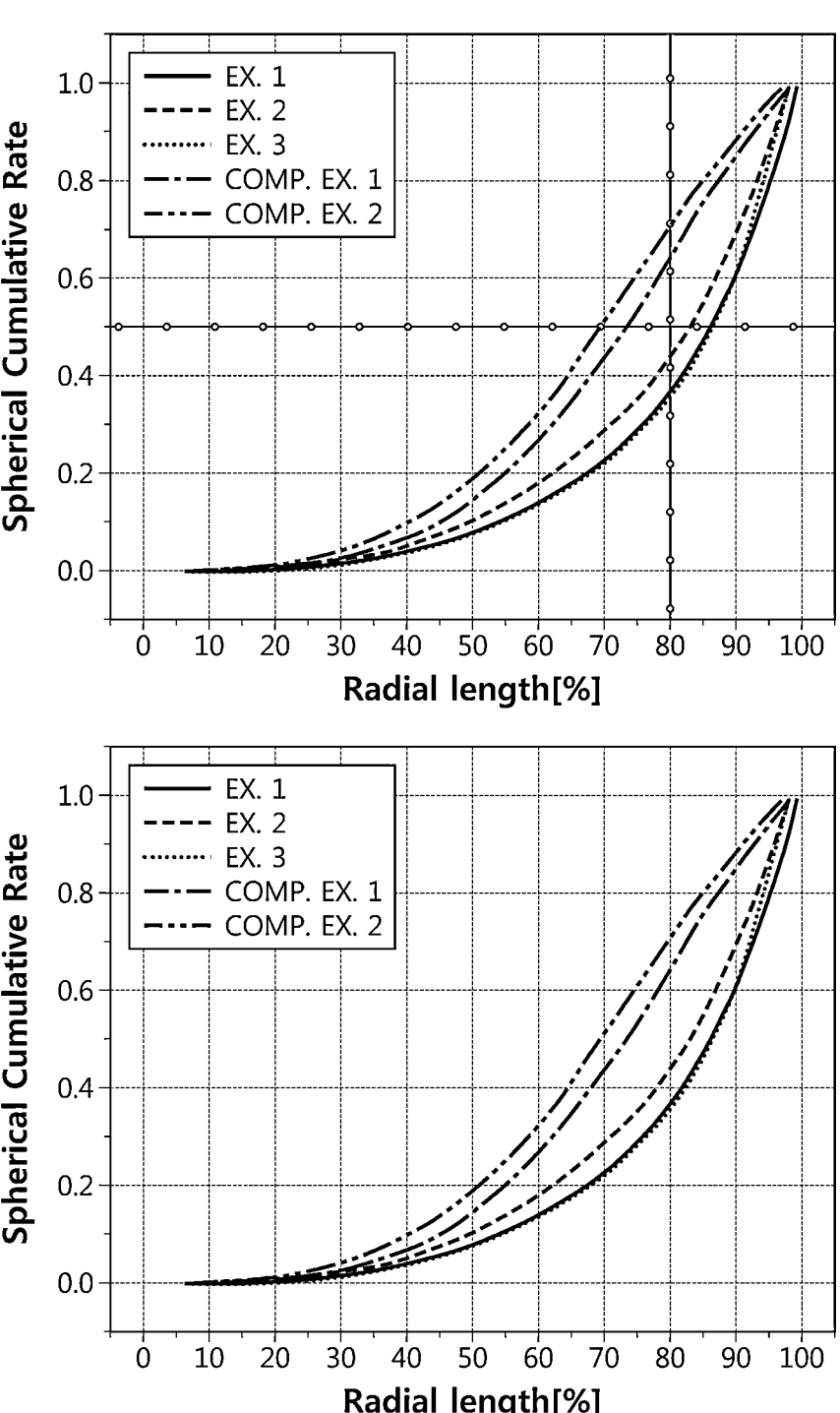
Figure 16:
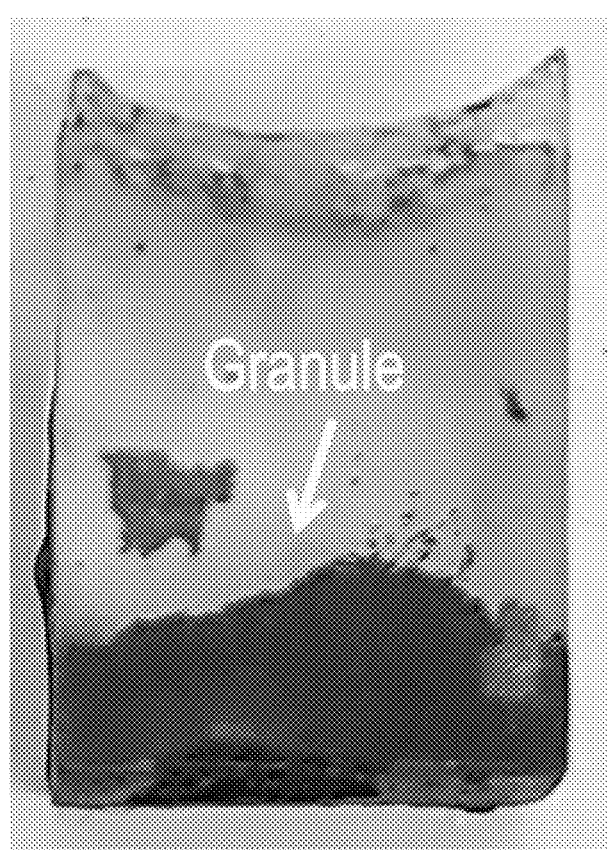
FIG. 16 is a photographic image illustrating the granule fixed in a cured epoxy resin.

The distribution of the binder in the granule was determined by using electron probe microanalyzer (EPMA) (JXA-8350F, −15 kV, 20 nm stage mapping condition) to analyze the radial profile of the section of granule. First, the binder in the granule obtained according to each of Examples 1-3 and Comparative Examples 1 and 2 was dyed by using $OsO_4$. The binder was dyed by introducing the granule into a glass material by using $OsO_4$ crystals or aqueous solution, and carrying out reaction by allowing the reagent to evaporate. Next, the granule was mixed with an epoxy resin and fixed and cured in a silicon mold to obtain a granule matrix (see, FIG. 16). Then, a section sample was fabricated from the granule matrix by using an ion milling device (Hitachi IM5000, accelerated voltage: 6 kV). The section was fabricated under the condition of an accelerated voltage of 6 kV and a discharge current of 400 μA, and the milling time was controlled suitably so that the mask may not be totally etched. The fabricated section sample was fixed in an EPMA system, the granule was disposed at the center of the display, and sectional scanning was carried out through a stage mapping mode. After completing the scanning, an image was generated in the form of a mass map considering the atomic number effect, absorption effect and the fluorescence excitation effect. Then, 0-4 wt % of elements were set to 5 contrast from the resultant mass map, and an Os map was extracted. The Os map was combined with a conventional rear scattering electron image obtained from the EPMA analysis into a single layer by using photoshop, and then a closed curve was plotted in the unit of 30 pixels from the boundary of the granule obtained therefrom to analyze the Os content disposed in each closed curve. The Os content was corrected by introducing the surface area of the closed curve at the corresponding position so that the relative content of one position may be compared with that of another position. FIG. 13a illustrates the distribution (content) of the binder resin in each portion along the radius of the granule according to each of Examples and Comparative Examples. FIG. 13b illustrates the accumulated distribution of the binder resin along the radius of the granule according to each of Examples and Comparative Examples. Referring to the results, it can be seen from the granule according to each of Examples 1-3 that the binder content in the surface portion ranging from 70% or more of the radius to the granule surface is higher than the binder content in the core portion. On the contrary, in the case of the granules obtained from Comparative Examples 1 and 2, the granules have a higher binder content in the core portion as compared to the surface portion.

Determination of Binder Distribution in Negative Electrode Active Material Layer The negative electrode obtained according to each of Example 1 and Comparative Example 4 was subjected to chemical reaction (deposition) sufficiently for 3 hours or more by introducing the negative electrode into a glass material with $OsO_4$ crystals or aqueous solution and allowing the reagent to evaporate. Then, a section of the negative electrode according to each of Example and Comparative Example was fabricated from the negative electrode subjected to reaction with Os by using Ar ion milling.

Then, the energy dispersive spectroscopy (EDS) detector of a scanning electron microscopy (SEM) instrument was used to carry out EDS mapping of the constitutional elements in the negative electrode active material layer of the section in the thickness direction of the negative electrode according to each of Example 1 and Comparative Example 4.

Figure 2:
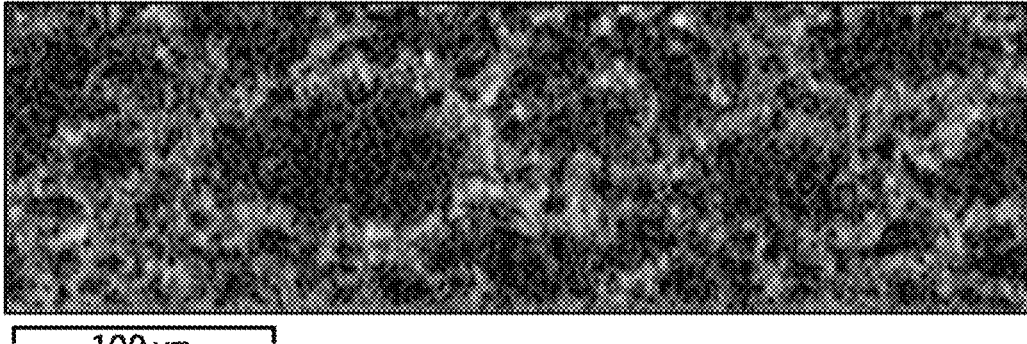
FIG. 2 shows the section of the electrode obtained by the method according to Example 1.
Figure 4:
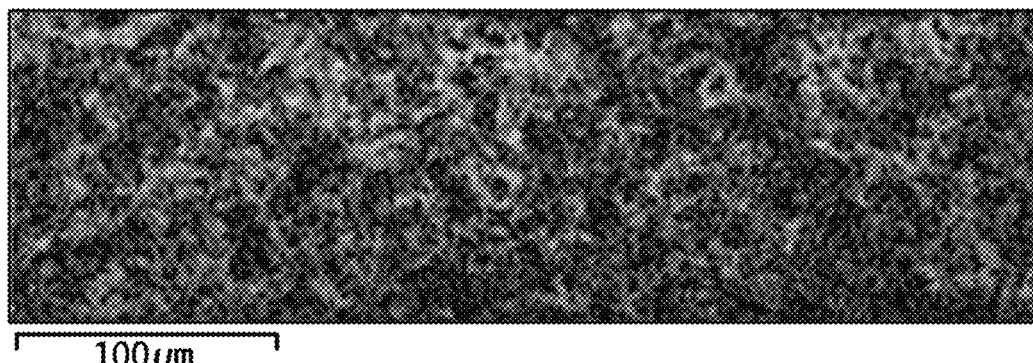
FIG. 4 shows the section of the electrode obtained by the method according to Comparative Example 4.

FIG. 2 shows the EDS mapping results of the electrode according to Example 1, FIG. 4 shows the EDS mapping results of the electrode according to Comparative Example 4. Referring to the results, it can be seen from the electrode according to Example 1 that a larger amount of binder resin is distributed in the granule surface portion as compared to the granule core portion. In addition, the electrode according to Example 1 is obtained by compressing the granules, and it can be seen that the binder is distributed uniformly in the electrode thickness direction. On the contrary, it can be seen from the electrode according to Comparative Example 4 that the electrode surface layer portion has a higher binder content ratio. Unlike the method for manufacturing the electrode according to Example 1, the electrode according to Comparative Example 4 is obtained through a process of electrode slurry coating and drying, and such a binder distribution results from the binder migration caused by the solvent evaporation.

Figure 3:
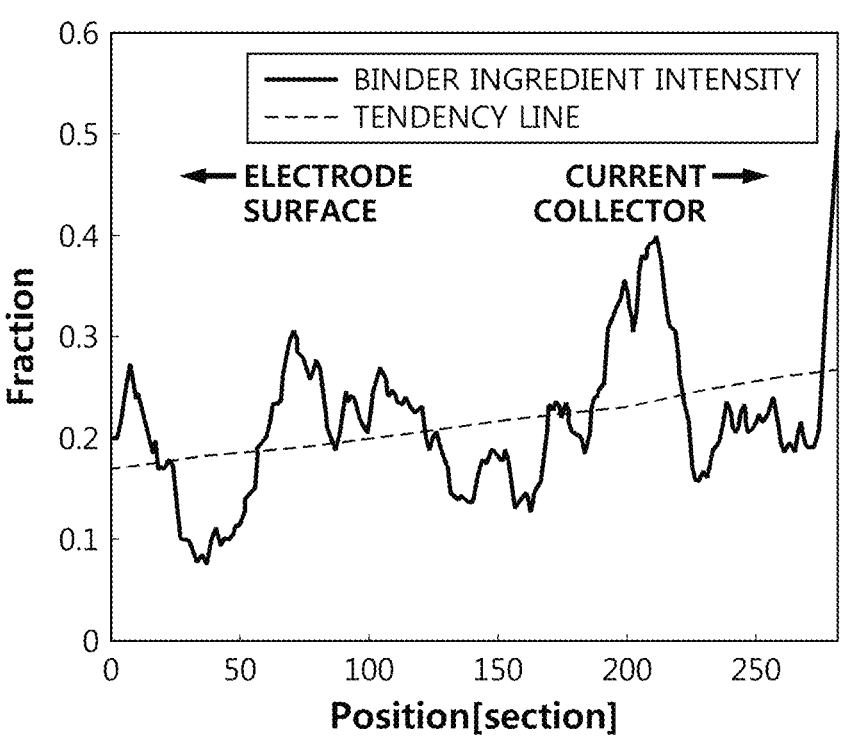
FIG. 3 is a graph illustrating the distribution of a binder in the thickness direction of the electrode active material layer in the electrode obtained by the method according to Example 1.
Figure 5:
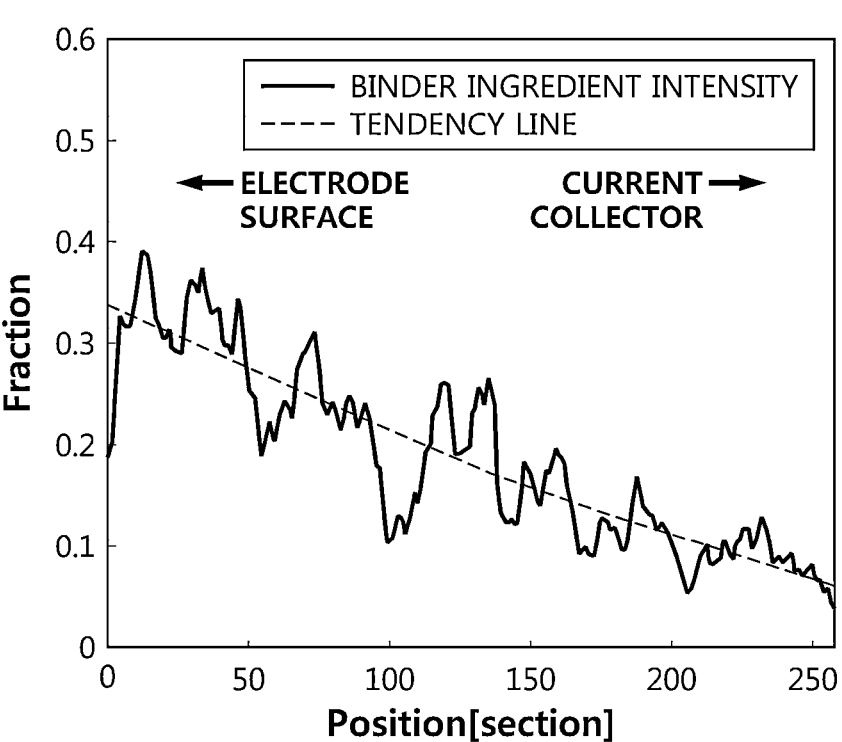
FIG. 5 is a graph illustrating the distribution of a binder in the thickness direction of the electrode active material layer in the electrode obtained by the method according to Comparative Example 4.

Meanwhile, each of FIG. 3 and FIG. 5 is a graph plotted by extracting a line profile from the EDS mapping results in the thickness direction of the negative electrode active material layer, and then extracting the average value of Os content of the binder bound to Os in the negative electrode active material layer surface region (from the surface to 15% toward the current collector) and the average value of Os content of the binder bound to Os in the electrode layer bottom region (from the current collector to 15% toward the surface layer portion) from the line profile results. FIG. 3 and FIG. 5 show the results of the electrode according to Example 1 and the electrode according to Comparative Example 4, respectively. Referring to the results, the electrode according to Example 1 shows a smaller deviation in binder distribution in the electrode thickness direction, as compared to the electrode according to Comparative Example 4.

Determination of Electrode Loading Amount Distribution

Figure 14:
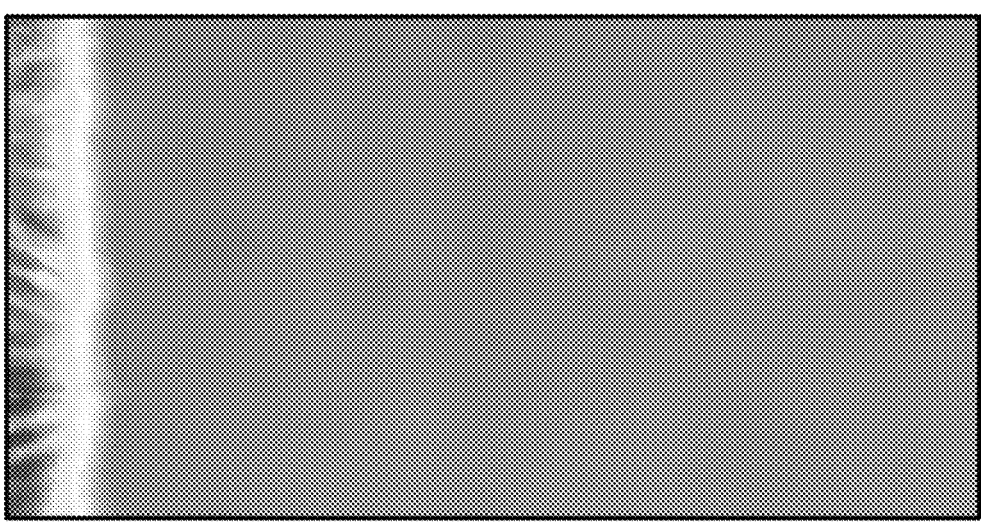
FIG. 14 illustrates the electrode loading amount distribution of the negative electrode according to Example 1.
Figure 15:
FIG. 15 illustrates the electrode loading amount distribution of the negative electrode according to Comparative Example 1.

The surface (negative electrode active material layer surface, 100 mm×150 mm size) of the negative electrode according to each of Example 1 and Comparative Example 1 was determined in terms of the electrode loading amount. The surface of each negative electrode was scanned by using an inductance analyzer (TSS20, Lasertec). Then, induced current was allowed to flow with a predetermined interval from the negative electrode to determine the information of the negative electrode active material itself formed on the current collector. An image illustrating the uniformity was obtained depending on the uniformity (ingredient distribution, thickness, porosity, etc.) of the negative electrode active material layer. It can be seen that the negative electrode according to Example 1 shows a uniform negative electrode active material loading amount over the whole negative electrode surface, while the negative electrode according to Comparative Example 1 shows a difference in terms of loading amount between the left side and the right side of the negative electrode. FIG. 14 illustrates the electrode loading amount distribution of the negative electrode according to Example 1, and it can be seen that the negative electrode shows a uniform distribution over the whole surface thereof. FIG. 15 illustrates the electrode loading amount distribution of the negative electrode according to Comparative Example 1, and it can be seen that the negative electrode shows a deviation by region.

What is claimed is:

1. A negative electrode for an electrochemical device, comprising:

a current collector;

an electrode active material layer disposed on the current collector; and a primer layer interposed between the current collector and the electrode active material layer, wherein the electrode active material layer comprises a granule, an electrode active material, and an electrode binder, and the electrode active material and the electrode binder are not granulated or incorporated into the granule;

wherein the granule has a core portion and a surface portion, wherein the core portion comprises a granule electrode active material and the surface portion comprises a granule electrode binder, wherein the surface portion is a region from a surface of the granule to 30% of a radius toward a center of the granule, and the core portion is a region other than the surface portion, wherein the granule electrode active material is bound to one another by the granule electrode binder, wherein a content of the granule electrode binder in the surface portion of the granule is higher than a content of the granule electrode binder in the core portion of the granule, based on 100 wt. % of a total weight of the granule electrode active material and the granule electrode binder, and wherein the primer layer at least partially or totally covers a surface of the current collector, wherein the primer layer comprises a conductive material and a binder.

2. The negative electrode according to claim 1, wherein the electrode active material layer shows a difference of 10 wt. % or less between a content (wt. %) of the binder based on 100 wt. % of an upper portion and a content (wt. %) of the binder based on 100 wt. % of a lower portion, when the electrode active material layer is divided into the upper portion and the lower portion based on a point corresponding to 50% of a thickness of the electrode active material layer from the current collector.

3. The negative electrode according to claim 1, wherein the electrode active material layer shows a difference of 10 wt. % or less between a content (wt. %) of the binder in a region from the current collector to 15% of a thickness of the electrode active material layer toward an electrode surface layer portion and a content (wt. %) of the binder in a region from the electrode active material layer surface portion to 15% of the thickness of the electrode active material layer toward the current collector.

4. An electrochemical device comprising a positive electrode, and the negative electrode of claim 1.

\* \* \* \* \*